United States Patent [19]

Padley et al.

[11] 4,276,322
[45] Jun. 30, 1981

[54] CHOCOLATE HAVING DEFINED HARD FAT

[75] Inventors: Frederick B. Padley, Welwyn Garden City, England; Cornelis N. Paulussen, Uitgeest; Cornelis Soeters, Rotterdam, both of Netherlands; David Tresser, London, England

[73] Assignee: Dever Brothers Company, New York, N.Y.

[21] Appl. No.: 795,830

[22] Filed: May 11, 1977

Related U.S. Application Data

[63] Continuation of Ser. No. 711,048, Aug. 2, 1976, abandoned, which is a continuation of Ser. No. 344,792, Mar. 26, 1973, abandoned.

[51] Int. Cl.$^3$ .......................... A23D 5/00; A23G 1/00
[52] U.S. Cl. ...................................... 426/660; 426/607
[58] Field of Search ............................... 426/607, 660

[56] References Cited

U.S. PATENT DOCUMENTS

| | | | |
|---|---|---|---|
| 2,975,063 | 3/1961 | Paul et al. | 426/607 |
| 3,431,116 | 3/1969 | Feuge | 260/409 |
| 3,492,130 | 1/1970 | Harwood | 426/607 |
| 3,541,123 | 11/1970 | Kawada et al. | 260/428.5 |
| 3,686,240 | 8/1972 | Kawada | 426/607 X |

FOREIGN PATENT DOCUMENTS 925805  5/1963  United Kingdom .

Primary Examiner—Joseph M. Golian
Attorney, Agent, or Firm—James J. Farrell; Melvin H. Kurtz; Irving N. Feit

[57] ABSTRACT

Chocolate is provided containing a hard fat comprising a mixture of a natural, high POP/POS/SOS-fat and a narrowly defined SOS/POS-fat. The hard fat lies within an area defined in FIG. 18, 19 or 20; in the absence of the SOS/POS-fat, the hard fat lies outside the area. Particular mixtures are also claimed for use as hard fats. Palm mid-fraction is a preferred natural, high POP/POS/SOS-fat.

1 Claim, 19 Drawing Figures

CHOCOLATE HAVING DEFINED HARD FAT

This application is a continuation of application Ser. No. 711,048 filed Aug. 2, 1976 and now abandoned which in turn was a continuation of Ser. No. 344,792, filed Mar. 26, 1973 and now abandoned.

Reference is made to our copending application Ser. No. 751,309 which is a continuation of Ser. No. 417,865 which was itself a continuation of Ser. No. 240,265. Both Ser. No. 417,865 and 240,265 are now abandoned.

The invention relates to fats, particularly to hard fats, often called hard butters.

BACKGROUND

Hard fats are specially important in confectionery, bakery and pharmaceutical products. Such fats have the special property that at room temperature they are hard but melt quickly at body temperature, e.g. in the mouth. The most important example of a hard fat is cocoabutter. Because of its very special properties, although also because of long association, cocoabutter can command high prices. There has been a long-standing need for fats that can act as replacers, for example, for cocoa-butter. As more fully explained below, fats have been developed that partly meet this need. But all these fats suffer from one or more disadvantages.

A further problem with hard fats is that, although they indeed have special properties particularly fitting them for their use in specialty products such as confectionery, bakery and pharmaceutical products, the theoretical optimum behaviour is far from met by the available fats. For instance there is a need for a fat that would enable chocolate to be prepared that would show less finger-imprinting than chocolate made from ococoa-butter but would still display sharp melting characteristics in the mouth. Another instance is the need for a fat that would enable chocolate to be made at comparatively high ambient temperature or, a separate problem, to be made using cooling water at a comparatively high temperature; at present manufacture of chocolate is almost impossible where high ambient or high cooling water temperatures occur. Further instances are the need for a fat there is more bloom-resistant than cocoa-butter and a fat that would enable chocolate to be stored under tropical or semi-tropical conditions e.g. in centrally heated buildings. General needs are for fats that enable more flexibility and for more reliable fats, i.e. fats of more consistent quality, than the hard fats at present available. Such a fat should preferably be compatible with most hard fats, particularly with cocoa-butter.

PRIOR PUBLICATIONS

Many prior publications exist that mention fats that can take the place of hard fats such as cocoabutter. To bring some order into this vast amount of material, these prior publications can be divided into three classes.

A. This is the most numerous and the fats described are those in practice most used. The fats are such that in the preparation of chocolate as much of the cocoa-butter must be removed as possible; cocoa-powder containing at most 10% cocoa-butter must be used instead of cocoa-liquor. This is because the fats are not compatible with cocoa-butter. They are nevertheless very useful and are used widely in the preparation of chocolate (note in this specification, as explained later, the term "chocolate" is given a broad meaning) for example for coating cakes, confectionery bars and ice creams. Examples are fats produced by fractionation and hydrogenation of palm kernel, groundnut and coconut oils. Examples of publications concerning such fats are U.S. Pat. No. 2,442,536; British patent specifications Nos. 694,970 and 1,107,206.

B. There are a number of prior proposals for fats that can replace part of the cocoa-butter used, for instance, in chocolate preparation; the fats are to a ueful extent compatible with cocoa-butter. Such cocoa-butter compatible hard fats include illipe butter, also known as Tengkawang fat, as described in Minifie, Chocolate, Cocoa and Confectionery: Science and Technology, J. and A. Churchill, 1970, shea fraction as described in British patent specification No. 893,337 and U.S. Pat. No. 3,171,748, Mowrah fat as described in U.S. Pat. No. 3,070,445, Kokum fat, Sal stearin, cottonseed stearin and similar stearins in which linoleic acid and linolenic acid groups have been selectively hardened to oleic acid groups, palm fractions, particularly mid-fractions, such as those described in British patent specification Nos. 827,172 and 925,805, and Dumari butter, Njave or Baku butter, Phulwara butter and Kepayan oil as described in U.S. Pat. No. 3,084,049. Further details, background and examples of such fats can be found in Hilditch, The Chemical Constitution of Natural Fats, Chapman and Hall, London, 1956, particularly pages 236 to 244 and 349 to 358. Such fats are characterized by their exceptionally high content of POP, POS and SOS. In general such fats consist of at least 60%, often more than 70%, of POP, POS and SOS.

(In this specification the following commonly accepted abbreviations and conventions are used:

| Symbol | Fatty Acid Residue |
|--------|--------------------|
| A | Arachidonic |
| E | Elaidic and double-bond isomers |
| G | Saturated |
| Ln | Linoleic |
| M | Myristic |
| O | Oleic and double-bond isomers |
| P | Palmitic |
| S | Stearic |
| U | Unsaturated |

Triglycerides will be designated as illustrated by the following examples:

SOS—1,3-distearoyl-2-oleoyl glycerol

SPO—1-stearoyl-2-palmitoyl-3-oleoyl glycerol $S_2O$—distearoyl-oleoyl glycerol; position of the acid residues unspecified.

C. There remains a third class of prior publications that describe synthetic mixtures that are reported to be compatible with or to be possible replacers for cocoa-butter. Some of these, such as Chapman et al. J. Chem. Soc. 1957, 1502 and Dutton et al, J. Amer. Oil Chem. Soc., 1961, 38, 96, report mixtures of synthetic fats with cocoa-butter fractions only as part of experiments to try to determine the triglyceride compositions of cocoa-butter. Other publications such as U.S. Pat. Nos. 3,012,890; 3,170,799 and 3,410,881 and British patent specification No. 1,252,224 describe various synthetic triglyceride mixtures as full substitutes or replacers for cocoa-butter. The use of such mixtures with specific fats of classes A and B is not disclosed or suggested and such mixtures have not been acceptable.

IMMEDIATE BACKGROUND TO THE INVENTION

In our co-pending patent application Ser. No. 751,309 which is a continuation of Ser. No. 417,865, itself a continuation of Ser. No. 240,265, both now abandoned is disclosed and claimed the use of a hard fat comprising a mixture of palm mid-fraction and SOS, POS or SOS/POS of at least 85% purity. Based on the same experiments, experiments with fats other than palm mid-fraction and experiments in which the levels of other components in such SOS/POS fats were measured, we have now appreciated that an SOS/POS fat that fulfils certain detailed purity requirements can, even if it is not 100% pure, be used widely for the improvement of the properties, as replacers of cocoa-butter in chocolate-manufacture, of the fats described under B above.

INVENTION

The invention provides a chocolate in which the hard fat present has a POP, POS, SOS-containing falling within an area defined in FIG. 18, 19 or 20 and comprises a cocoa-butter compatible hard fat with a POP, POS, SOS-composition outside the area and an SOS/POS-fat consisting of (A) from 80% to 98% of SOS and POS,
(B) other O, P and S triglycerides consisting, by weight of the SOS/POS fat, of
  (a) less than 5% of GGG,
  (b) less than 5% of PPP,
  (c) less than 3% of each of other GGG,
  (d) less than 10% GGO consisting, by weight of the SOS/POS fat, of
    (1) less than 5% of each of PSO and SPO,
    (2) less than 3% PPO, and
    (3) less than 8% SSO,
  (e) less than 10% OOG,
  (f) POP and
(C)
  (a) less than 10% of each of SES and SLnS,
  (b) less than 5% of each of PES, PLnS, PEP and FLnP, and
(D) partial glycerides of O, P and S, consisting, based on the SOS/POS fat, of
  (a) less than 10% of each of total mono-glycerides, of total di-glycerides, of diglycerides containing at least one O, and of unsaturated mono-glycerides, and
  (b) less than 6% of each of saturated mono-glycerides and of disaturated diglycerides, in (B), (C) and (D) at most 15%, based on the total fatty acid residues in the SOS/POS fat, of P and S being randomly replaced by M and A.

FIGURES

The figures are based on many hundreds of investigations and make apparent many advantageous aspects of the invention. The tests and procedures used are described below.

In the Figures, A represents POS fat; B represents SOS fat; C represents palm mid-fraction; D represents cocoa-butter; E represents Illipe; F represents shea stearin; and G represents POP.

The following is a brief description of the Figures. A more detailed description is given later in the specification when preferred aspects of the invention are described that the Figures illustrate.

Figure 1:
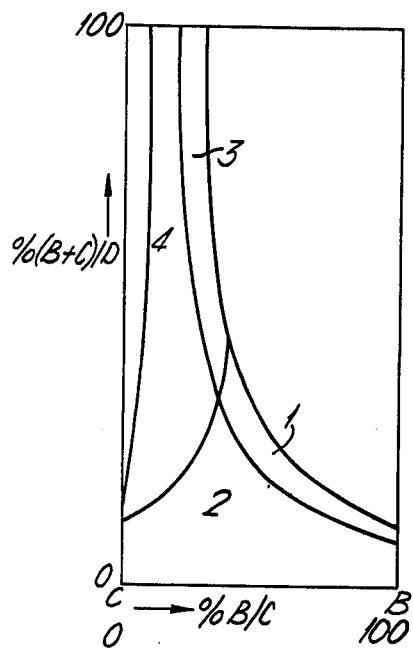
FIGS. 1, 2, 3 and 4 show mixtures of palm mid-fraction and SOS fat, optionally with cocoa-butter, that can be used advantageously in chocolate.

Further details of the Figures are given in the following description.

Preferred Minimum Impurity Levels

The amount of $G_3$ (i.e. GGG other than $P_3$) should preferably be less than 0.5%.

The amount of $G_3$ and the amount of $P_3$ should each preferably be less than 1%.

The amount of GGO should preferably be less than 5%, especially less than 1%. The amount of PSO and the amount of SPO should preferably be less than 2.5%. The amount of PPO should preferably be less than 1.5%. The amount of SSO should preferably be less than 2.5%. It is particularly surprising how detrimental SSO is in the SOS/POS-fat.

The amount of OOG should preferably be less than 5%, especially less than 1%.

The amount of SES and the amount of SLnS should preferably be each less than 5%. It is particularly surprising how detrimental is the effect of SLnS; for instance it is more detrimental to the physical properties than SES. The amount of PES, of PLnS, of PEP and of PLnP should each preferably be less than 2.5%.

The amount of POP can be negligible.

The amount of total mono-glycerides, the amount of unsaturated mono-glycerides and the amount of total diglycerides should each preferably be less than 3%. The amount of total diglycerides and the amount of diglycerides containing at least one O should each preferably be less than 2%. The amount of saturated mono-glycerides should preferably be less than 1%.

The amount of P and S that is randomly replaced by M and A in (B), (C) and (D) should preferably be less than 5%.

The SOS/POS-fat will preferably have an Iodine Value less than 35, particularly preferably less than 30.

It will be noted that in the above definition of the SOS/POS-fat no mention is made of $U_3$. It has been found that such triglycerides, at least $O_3$, have negligible interaction with the SOS/POS-fat. Therefore, if the SOS/POS-fat naturally contains some $O_3$, this can be ignored. Similarly small amounts, less than 0.5%, of unsaponifiables can be ignored.

A particular feature of the invention is our surprising discovery that, if the impurities are those specified, an SOS/POS-fat can be widely and advantageously used with a purity below 98%, even below 92%.

The amount of SOS and POS should preferably be at least 85%.

PARTICULAR ASPECTS OF THE INVENTION

The benefits of the invention are particularly apparent when the hard fat present in the chocolate comprises palm mid-fraction and the SOS/POS-fat. In principle palm mid-fraction is just a highly preferred example of a high-POP fat all of which can especially beneficially be used in chocolate in admixture with the SOS/POS-fat.

Particular aspects of the invention are mixtures of the SOS/POS-fat and palm mid-fraction that can be used in the preparation of chocolate as partial replacers, full replacers or replacers for cocoa-butter.

When the SOS/POS-fat contains no or minimal (less than 15%) POS, it will be referred to an SOS fat; similarly POS fat will denote an SOS/POS-fat containing no or minimal (less than 15%) SOS.

SOS FAT IN PALM MID-FRACTION

It has been found that the incorporation of SOS fat in palm mid-fraction gives a fat that is a useful and general partial replacer for cocoa-butter, particularly useful in the preparation of normal plain chocolate. The fat can be used at higher levels in plain and in milk chocolate that can palm mid-fraction. Alternatively, requirements for palm mid-fraction when using such a fat can be less strict than when using palm mid-fraction alone. The incorporation of small amounts of the SOS fat has the further advantage that more palm mid-fraction can be incorporated in plan chocolate than when palm mid-fraction alone is used as replacer. A further and very important effect is that the anti-blooming property is even better than that of palm mid-fraction alone. The incorporation of SOS fat in palm mid-fraction advantageously raises the dilatations and melting point and improves the crystallization and tempering characteristics. The effects are best appreciated when the mixture of SOS fat and palm mid-fraction consists of between 5% and 95% of palm mid-fraction and 95% and 5%, particularly between 95% and 20%, of the SOS fat. 20% of SOS fat is the level above which the anti-bloom properties are particularly significant.

It will be appreciated that one aspect of the invention is fat comprising a mixture of palm mid-fraction and SOS fat, particularly in the given proportions. Other aspects are cocoa-butter and chocolate containing such mixtures.

The eating qualities, particularly the cooling effect, are generally better for products containing mixtures made by incorporating SOS fat or SOS/POS fat in palm mid-fraction than for products made by incorporating SOS fat or an SOS/POS fat without palm mid-fraction.

It has been surprisingly found that the incorporation of SOS fat or the SOS/POS fat consisting substantially of SOS is advantageous compared with the incorporation of POS fat. From the known composition of cocoa-butter, in which POS is the dominant triglyceride, it might have been supposed that the incorporation of POS fat would have been especially advantageous.

SOS/POS fat is considered to consist substantially of SOS when at least 60%, preferably at least 80%, of the total SOS and POS, i.e. the specific chemical compounds, is SOS.

The normal level at which Coberine, referred to below, is incorporated in plain chocolate at least in the U.K. is about 18%, based on the total fat content. It has been found that a hard fat replacer consisting of 50 to 80% palm mid-fraction and 50 to 20% SOS fat can be incorporated in normal plain chocolate up to at least that level, i.e. even at higher levels. The tempering conditions usually need not be altered. Levels of 40 to 25% SOS fat represent an optimum. For instance a fat consisting of 70% palm mid-fraction and 30% SOS fat can be incorporated in cocoa-butter at the 36% level, based on total fat, to give a normal plain chocolate. An indication of the levels at which such hard fat replacers can be used is given in FIGS. 1 and 3.

If the possibility of having to alter tempering conditions is accepted then the following composition is of great interest. It has been found that a hard fat replacer consisting of 65 to 92% palm mid-fraction and 35 to 8% SOS fat can be used as a full fat replacer in the preparation of plain chocolate. The replacer preferably consists of 15% SOS fat. Preferably the replacer should be used up to the 50% level, based on total fat, particularly preferably at the 30% level. A special advantage is that by use of such replacers at least 40%, for instance 50%, of palm mid-fraction can be incorporated in cocoa-butter.

Further it has been discovered that a fat consisting of a mixture of palm mid-fraction and the SOS fat and containing up to 42% of palm mid-fraction can be used as a partial replacer for cocoa-butter to give a hardened milk chocolate. A fat consisting of palm mid-fraction and SOS fat and containing less than 70% SOS fat, has been found to enable more palm mid-fraction to be incorporated than when palm mid-fraction alone is used as replacer.

It has been found that, when the amount of SOS fat incorporated in the palm mid-fraction is such that the fat obtained consists of 8% to 20% SOS fat and 80% to 92% palm mid-fraction, the fat is an excellent full fat replacer; excellent normal plain chocolate can be prepared using this fat instead of cocoa-butter. Adjustment of tempering conditions must be made. Also, when the fat consists of 20% to 35%, preferably to 30% of the SOS fat and 65% to 80% palm mid-fraction, the fat can be used as a full fat replacer to prepare a plain chocolate suitable for tropical use. Adjustment of tempering conditions must be made.

Figure 16:
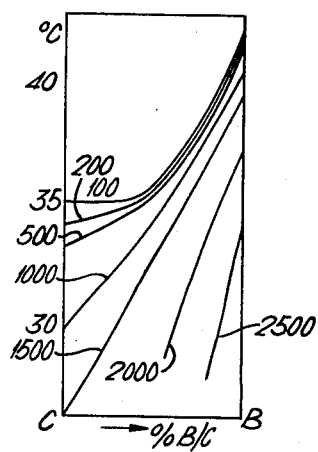
FIG. 16 shows iso-dilatation lines for mixtures of SOS fat and palm mid-fraction.

FIG. 16 demonstrates the surprisingly beneficial effects of the addition of SOS fat to palm mid-fraction and of palm mid-fraction to SOS fat. The lines in the Figure are iso-dilatation lines as described in GB Pat. No. 1,228,139.

SOS FAT, PALM MID-FRACTION AND COCOA-BUTTER

As indicated, an aspect of the invention is the incorporation of SOS fat to form ternary mixtures of cocoabutter, palm mid-fraction and the SOS fat. All the fats obtained described above by the incorporation of SOS fat with palm mid-fraction can be used to form such ternary mixtures. Preferred levels in which such fats can be incorporated in cocoa-butter are shown in FIG. 1 for plain chocolate and in FIG. 3 for milk chocolate containing 15% milk fat based on total fat.

In FIG. 1, area 1 represents compositions which give plain chocolate suitable for tropical use; area 2 represents compositions which give normal plain chocolate; area 3 represents compositions which give plain chocolate for tropical use if possible change of tempering conditions is acceptable; and area 4 represents compositions which give normal plain chocolate if possible change of tempering conditions is accepted.

Figure 3:
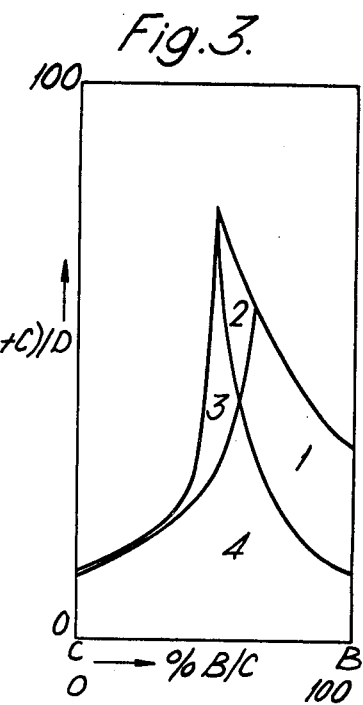

In FIG. 3, area 1 represents compositions which give hardened milk chocolate; area 2 represents compositions which give hardened milk chocolate if possible change of tempering conditions is accepted; area 3 represents compositions which give normal milk chocolate if possible change of tempering conditions is accepted; and area 4 represents compositions which give normal milk chocolate.

It should be noted that the order of mixing does not affect the properties obtained nor does it affect the applicability of the underlying invention, i.e. that the incorporation of SOS fat in palm mid-fraction surprisingly improves the hard fat replacer properties of the palm mid-fraction, e.g. the SOS fat and the palm mid-fraction can be separately mixed into the product. Further ternary mixtures are described as follows.

Figure 2:
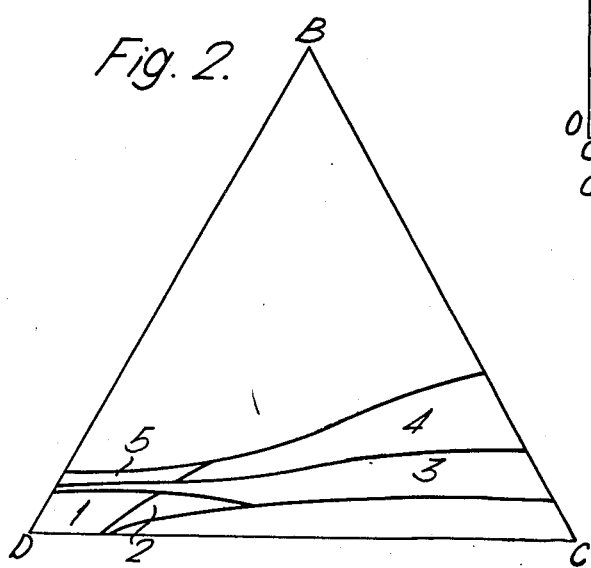

Some preferred compositions for normal plain chocolate are represented by the areas 1 and 2 in FIG. 2. A preferred area in which the tempering conditions usually need not be altered is 1.

A fat that consists of a mixture of cocoa-butter, SOS fat and palm mid-fraction, and that is represented by area 3 in FIG. 2 has been found to be a full replacer in the preparation of adequate plain chocolate.

Fats that have been found to be useful full fat replacers in the preparation of a plain chocolate for tropical purposes are represented by areas 4 and 5 in FIG. 2. Area 5 represents a preferred area in which the tempering conditions usually need not be altered.

Figure 4:
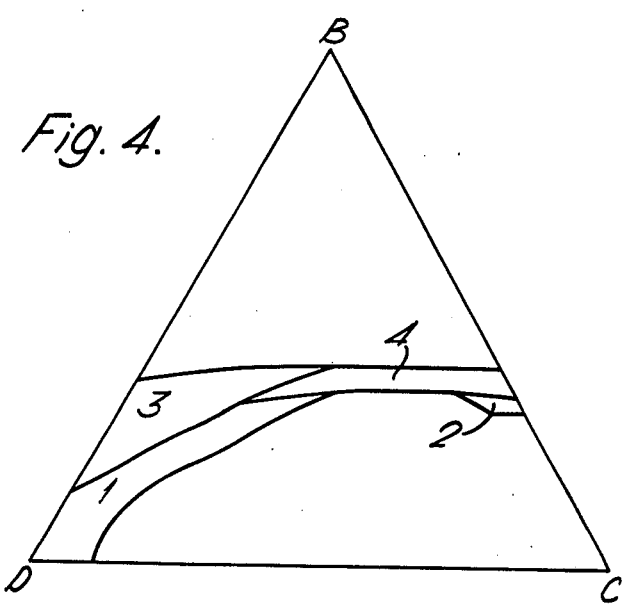

In FIG. 4 are represented preferred ternary mixtures of cocoa-butter, palm mid-fraction and SOS fat for the preparation of milk chocolate containing, by weight of total fat, 15% milk fat. Areas 1 and 2 represent compositions that can give normal milk chocolate. Area 3 represents compositions that give adequate milk chocolate. Area 4 represents compositions that can give hardened milk chocolate.

SOS/POS FAT AND PALM MID-FRACTION

As explained above the invention comprises the use of both SOS fat and POS fat although the use of SOS fat, alone or in admixture with POS fat, is a special feature. Particular advantageous combinations of SOS/POS fat and palm mid-fraction are described below. It should be noted that the SOS fat and the POS fat can be incorporated separately or together.

Figure 5:
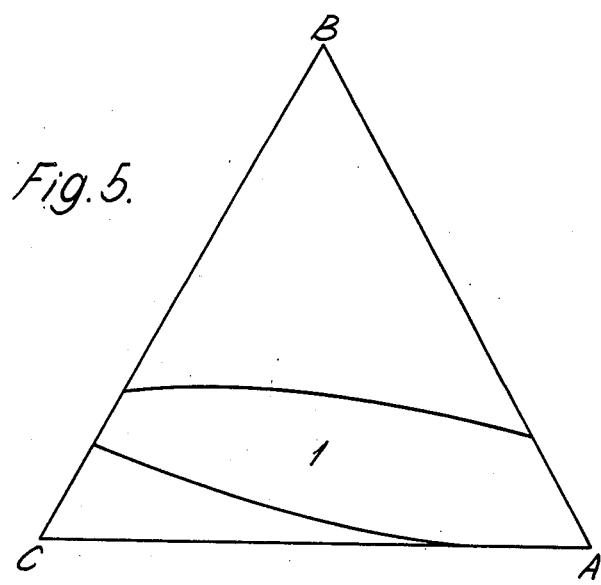
FIG. 5 shows mixtures (the numbered areas) of palm mid-fraction SOS fat and POS fat that can be used advantageously in chocolate.

Particularly advantageous hard fat replacers are those that can replace all the added cocoa-butter used in good quality chocolate, i.e. that can be used as the additional fat to that present in the cocoa-liquor. The amount of such added fat is usually from 20% to 50%, often about 30% of the total fat. It has been found that a hard fat replacer consisting of a mixture of palm mid-fraction, and, notionally, both SOS fat and POS fat and containing less than 30% of SOS fat and less than 80% palm mid-fraction can fulfil the advantage. FIG. 5, area 1, represents a preferred range of such replacers which can be used in the preparation of adequate plain chocolate.

It has been discovered that a fat formed by the incorporation of either SOS fat or POS fat or a combination of both and consisting of up to 75% palm mid-fraction and notionally from 0 to 60% of POS fat and any remainder of SOS fat is useful as a partial replacer for cocoa-butter to give a plain chocolate suitable for tropical use. By notionally is meant that either SOS fat and POS fat are incorporated or an SOS/POS fat containing SOS and POS in the required proportions. When below percentages are given of SOS fat and POS fat, these are to be read as including the possibility of adding an SOS/POS fat containing SOS and POS in the required proportions. When the percentage of SOS fat is greater than 30 preferably than 50, there is the additional advantage that the tempering conditions need not usually be altered.

Further such a fat consisting of 3% to 35% of SOS fat, 36% to 54% of POS fat and 15% to 35% palm mid-fraction has been found to be an excellent full fat replacer in the preparation of plain chocolate. Usually the tempering conditions need not be altered.

Also such a fat consisting of 5% to 35% of SOS fat, 50% to 80% of POS fat and 10% to 30% palm mid-fraction has been found to be an excellent full fat replacer in the preparation of a tropical plain chocolate. When the amount of palm mid-fraction is less than 23%, usually the tempering conditions need not be altered.

Also it has been discovered that a fat consisting of a mixture of 27% to 42% of SOS fat, 30% to 50% of POS fat and 17% to 33% palm mid-fraction is a useful full fat replacer in the preparation of milk chocolate. The tempering conditions usually need ot be altered.

Also fats having the following compositions, prepared by the incorporation of SOS fat and/or POS fat are useful full fat replacers in the preparation of hardened milk chocolate:

(a) 0% to 30% of SOS fat, at least 70% of POS fat and up to 30% palm mid-fraction;
(b) 15% to 40% of SOS fat, 45% to 70% of POS fat and up to 15% palm mid-fraction, and
(c) 40% to 55% of SOS fat, 20% to 55% of POS fat and 5% to 30% palm mid-fraction.

Figure 17:
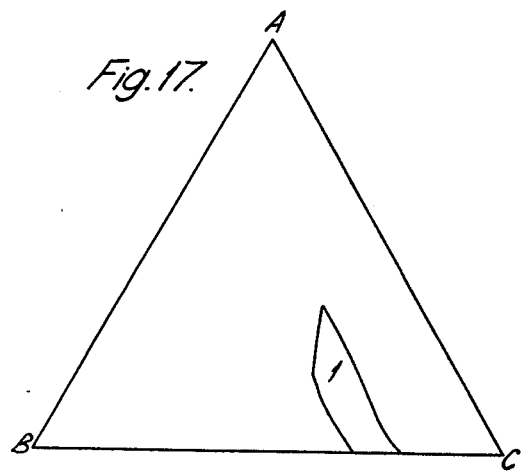
FIG. 17 shows a mixture (the numbered area) of POS fat SOS fat and palm mid-fraction that has at least comparable properties to the cocoa-butter replacer called Coberine described on page 66 Minifie as referred to above.

An excellent partial cocoa-butter replacer, as mentioned on page 66 of the book by Minifie referred to above, is sold on the U.K. market under the trade name Coberine. Such a product has to meet severe requirements. It has been found that compositions represented by the area 1 in FIG. 17 fulfil these requirements.

POS FAT IN PALM MID-FRACTION

Such general advantages as more flexibility and consistency of formulation of the incorporation of POS fat in palm mid-fraction have been mentioned above. Below are given particularly advantageous levels of incorporation.

It has been found that a fat consisting of a mixture of palm mid-fraction and, based on the fat, at least 40%, preferably at least 60% POS fat is a useful hard fat replacer. When it contains between 40% and 60% of POS fat it can be used as an adequate replacer for Coberine and can be used at high levels in chocolate. When it contains more than 60% of POS fat it can be used at high levels in chocolate to give plain chocolate suitable for tropical use. These replacers are preferably used up to a total of 50%, particularly at 30% of the cocoa-butter normally used.

Coberine is an excellent partial cocoa-butter replacer, as mentioned on page 66 of the book by Minifie referred to above, sold on the U.K. market under this trade name. Such products are described in GB patent specifications No. 827,172 and 925,805 and contain other fats as well as palm mid-fraction.

It has been discovered that a fat formed by the incorporation of POS fat with palm mid-fraction and that consists of palm mid-fraction and up to 80% of POS fat is a useful partial replacer for cocoa-butter. It enables more palm mid-fraction to be incorporated in plain chocolate than when palm mid-fraction alone is used as replacer. Alternatively, requirements for palm mid-fraction can be less strict than when using palm mid-fraction alone.

Also it has been discovered that such a fat consisting of POS fat and up to 45% of palm mid-fraction can be useful as a partial replacer for cocoa-butter to give a plain chocolate suitable for tropical use.

Also such a fat consisting of 15% to 25% palm mid-fraction and 75% to 85% of POS fat is an excellent full fat replacer; excellent plain chocolate can be prepared using this fat instead of cocoa-butter.

Further such a fat consisting of POS fat and up to 50% palm mid-fraction is an excellent full fat replacer for use in the preparation of milk chocolate. When the amount of palm mid-fraction is less than 35%, hardened milk chocolate can be obtained.

POS FAT, PALM MID-FRACTION AND COCOA-BUTTER

As indicated, an aspect of the invention is the incorporation of POS fat to form ternary mixtures of cocoa-butter, palm mid-fraction and POS fat. The fats described above obtained by the incorporation of POS fat in palm mid-fraction can be used to form such ternary mixtures.

Figure 6:
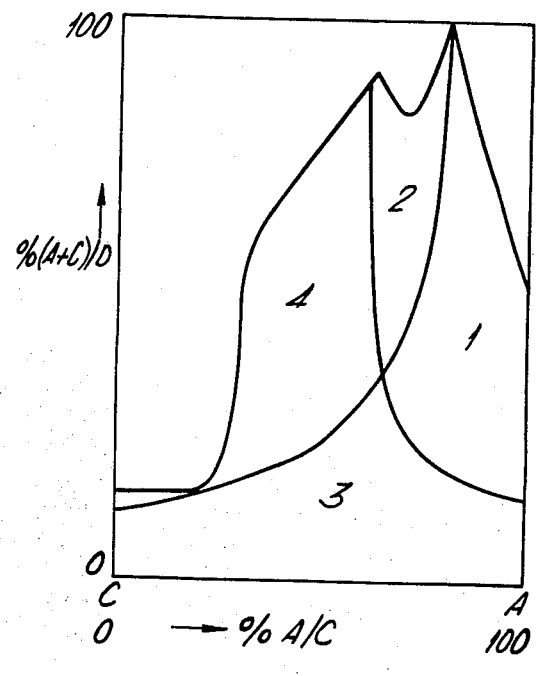
FIGS. 6, 7, 8 and 9 show mixtures (the numbered areas) of palm mid-fraction and POS fat, optimally with cocoa-butter, that can be used advantageously in chocolate.
Figure 7:
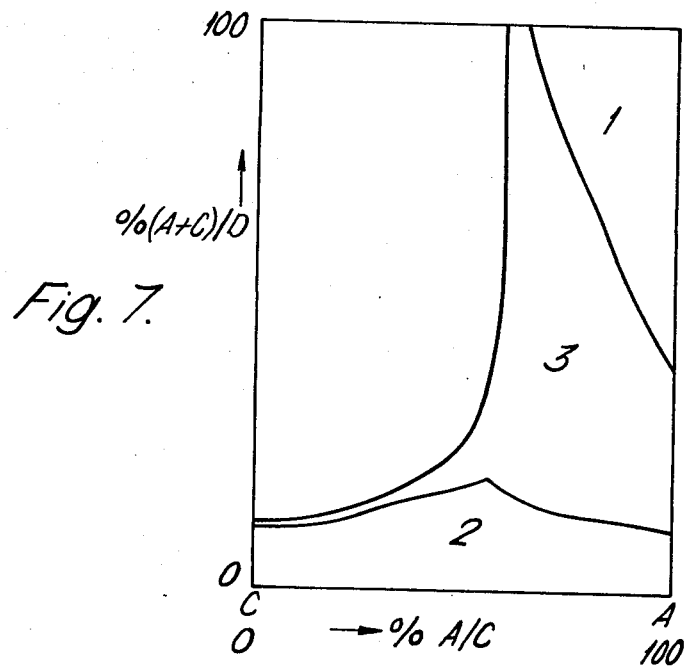

Preferred levels in which such fats can be incorporated in cocoa-butter are shown in FIG. 6 for plain chocolate and in FIG. 7 for milk chocolate.

In FIG. 6, area 1 represents compositions which can give plain chocolate suitable for tropical use; area 2 represents compositions which can give plain chocolate suitable for tropical use if possible change of tempering conditions is accepted; area 3 represents compositions which can give normal plain chocolate; and area 4 represents compositions which can give normal plain chocolate if possible change of tempering conditions is accepted. In FIG. 7, area 1 represents compositions which can give hardened milk chocolate if possible change of tempering conditions is accepted; area 2 represents compositions which can give normal milk chocolate; and area 3 represents compositions which can give normal milk chocolate if possible change in tempering conditions is accepted. As is generally true for products formed by the incorporation of SOS/POS fat the order of mixing does not especially affect the properties obtained. Particular ternary mixtures are as follows.

Figure 8:
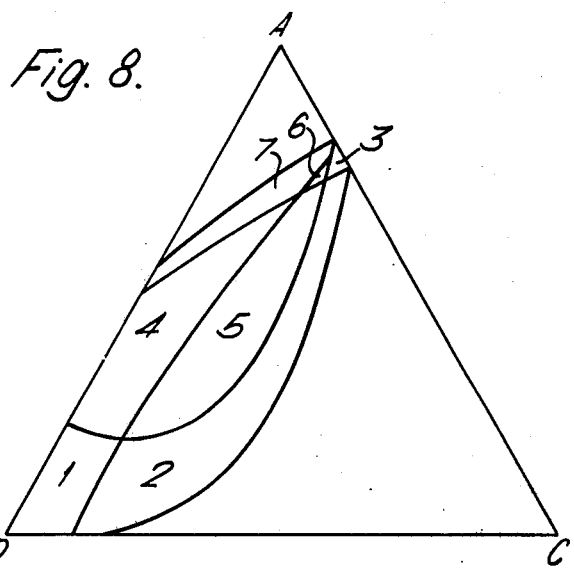

It has been found that the fat compositions shown in FIG. 8 are particularly useful in the preparation of plain chocolate.

The compositions defined by areas 1 and 2 have been found to be useful for preparing normal plain chocolate and those defined by area 3 for preparing adequate plain chocolate. Compositions defined by area 1 are preferred because usually tempering conditions need not be altered.

The compositions defined by areas 4, 5, 6 and 7 have been found to be useful for preparing plain chocolate suitable for tropical use. Compositions defined by areas 4 and 7 are preferred because usually tempering conditions need not be altered. Compositions defined by areas 4 and 5 are preferred because the chocolate prepared has surprisingly sharp melting characteristics in the mouth.

Figure 9:
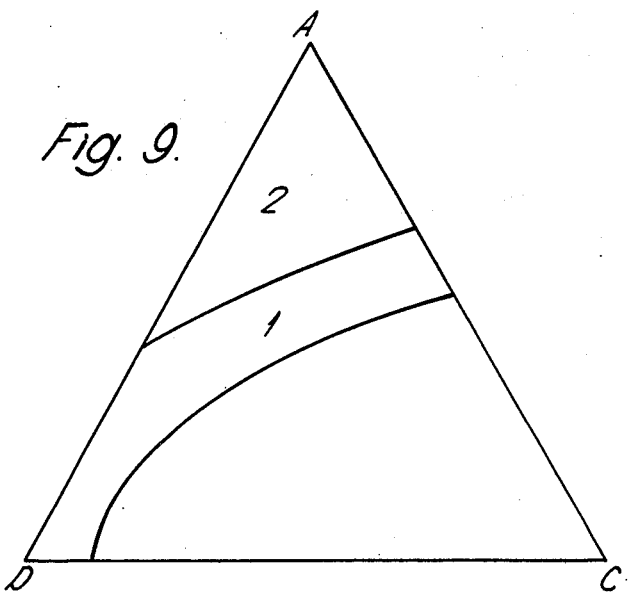

Similarly it has been found that the fat compositions shown in FIG. 9 are particularly useful in the preparation of milk chocolate containing 15% milk fat. Compositions defined by area 1 are particularly useful in the preparation of normal milk chocolate, compositions defined by area 2 in the preparation of hardened milk chocolate.

SOS/POS FAT WITH PALM MID-FRACTION AND SHEA STEARIN, ETC.

As disclosed in British patent specification Nos. 827,172 and 925,805, see in particular British patent specification 827,172, page 3, lines 37 to 106 and the examples, palm mid-fraction can particularly advantageously be used as a cocoa-butter replacer in admixture with so-called "Borneo tallow type fat". It is a further feature of the present invention that the incorporation of SOS/POS fat is particularly beneficial when the mixture obtained contains one or more of such fats.

Figure 14:
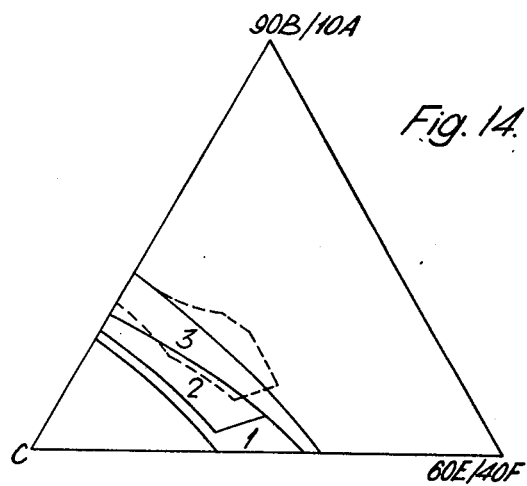
FIG. 14 shows advantageous mixtures (the numbered areas) of SOS/POS fat with either or both palm mid-fraction and a 60:40 mixture of Illipe and shea stearic.

FIG. 14 shows some areas representing particularly useful compositions. Considering the areas based on dilatations and defined by the continuous lines area 1 represents compositions that are comparable to cocoa-butter and area 3 represents compositions which can be used to prepare plain chocolate suitable for tropical use. The discontinuous line defines the area where tempering conditions are similar to those of cocoa-butter.

Figure 15:
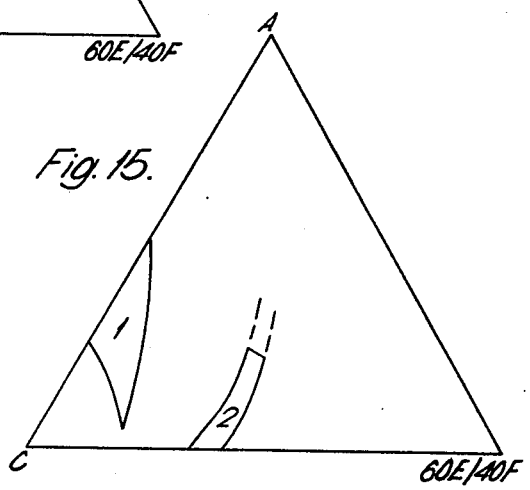
FIG. 15 shows advantageous mixtures (the numbered areas) of POS fat with either or both palm mid-fraction and a 60:40 mixture of Illipe and shea stearin.

FIG. 15 shows some preferred areas, based on dilatation work. Area 1 represents compositions that are comparable to Coberine. Area 2 represents compositions that are comparable to cocoa-butter. From these and subsequent Figures the general use of SOS/POS fats is made clear, i.e. use is not necessarily limited to use with palm mid-fraction. Particularly with preferred SOS/POS fats novel and advantageous hard fat replacers are obtained more generally. SOS/POS fats for instance can be used to improve low quality natural hard fats, in particular cocoa-butter. Natural fats can be of low quality because, for instance, of use of the shell of the bean or of poor storage.

INCORPORATION IN COCOA-BUTTER

The use of SOS/POS fat with cocoa-butter and without any other cocoa-butter replacer gives substantial benefits. It is particularly surprising that SOS fat is even more beneficial than POS fat. More detailed aspects of use of SOS/POS fats with cocoa-butter are described below.

SOS FAT

It has been found that an excellent normal plain chocolate can be prepared if up to 8% of cocoa-butter is replaced by SOS fat. Tempering can be carried out under normal conditions. The chocolate is improved, for instance with respect to bloom, finger-imprinting and hardness characteristics and can be compared to chocolate made from the very best quality cocoa-butter.

When from 8 to 11% of the cocoa-butter is replaced with SOS fat, a plain chocolate suitable for tropical use can be obtained, although in its preparation some adjustment of tempering times must be considered.

Replacement of up to 12% of cocoa-butter by SOS fat enables an excellent milk chocolate to be prepared. When from 12 to 35% of cocoa-butter is replaced with SOS fat, a hardened milk chocolate can be prepared.

POS FAT

When up to 25% of cocoa-butter is replaced by POS fat, it has been found that normal plain chocolate can be prepared. When from 25% to 55%, preferably to 50%, of cocoa-butter is replaced by POS fat, plain chocolate suitable for tropical use can be prepared.

When up to 40% of cocoa-butter is replaced by POS fat, it has been found that normal milk chocolate can be prepared. When 40% to 100% of cocoa-butter is replaced, a hardened milk chocolate can be prepared.

SOS/POS FAT

A fat consisting of a mixture of up to 40%, preferably up to 30% SOS fat, at least 10%, preferably at least 15% POS fat and 0% to 55% cocoa-butter can be used to prepare a hardened milk chocolate.

GENERAL USE OF SOS/POS FATS

Figure 18:
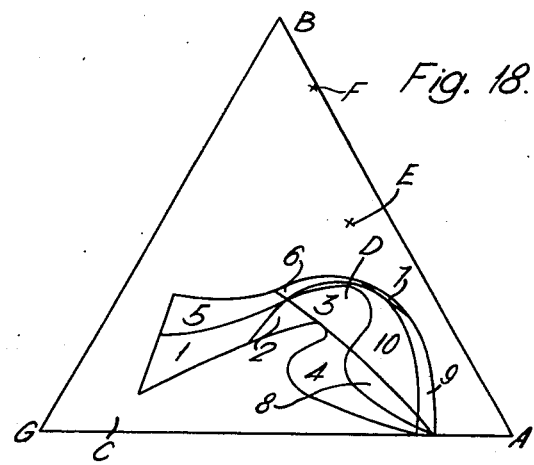
FIGS. 18, 19 and 20 show hard fats (the numbered areas) in terms of their POP, SOS and POS compositions that have advantages when used in chocolate.
Figure 19:
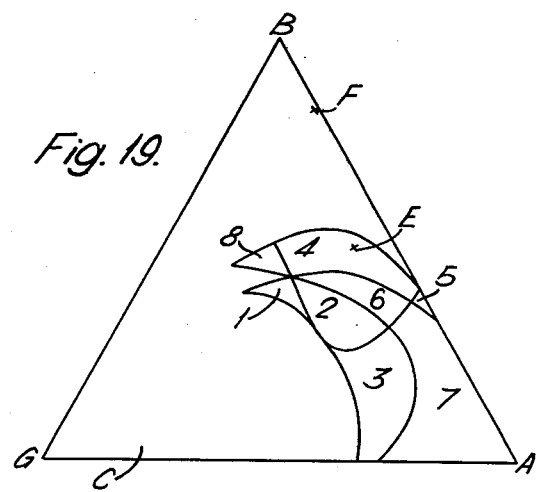
Figure 20:
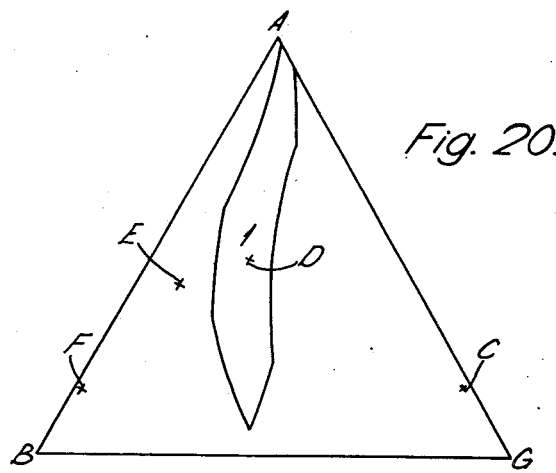

Many other novel and advantageous possibilities for the use of SOS/POS fat, either in admixture with palm mid-fraction or not, will be apparent from FIGS. 18, 19 and 20. These figures are based on work with SOS fat, POS fat and palm mid-fraction of the quality described later. But as indicated it has been found that the results can be used predictively more generally.

Area 1 in FIG. 20 represents compositions that can be expected to require comparable tempering conditions to cocoa-butter. This Figure is based on work using the Jensen cooling curve. The technique used for measuring the Jensen cooling curve is described in our copending application Ser. No. 751,309 which is hereby incorporated by reference.

The formulations shown in FIG. 18 were found to be particularly useful in the preparation of plain chocolate.

The compositions defined by areas 1, 2, 3 and 4 have been found to be useful for preparing normal plain chocolate. The compositions defined by areas 2, 3 and 4 are preferred because plain chocolate can be obtained that is particularly sharp-melting. Compositions defined by area 3 are particularly preferred because usually the tempering conditions need not be altered.

The compositions defined by areas 5, 6, 7, 8, 9 and 10 have been found to be useful for preparing plain chocolate suitable for tropical use. Compositions defined by areas 8 and 10 are preferred because plain chocolate can be obtained that is particularly and surprisingly sharp-melting. Compositions defined by areas 6, 9 and 10 are preferred because usually tempering conditions need not be altered.

The formulations shown in FIG. 19 are found to be particularly useful in the preparation of milk chocolate.

The compositions defined by areas 1, 2 and 3 have been found to be useful for preparing normal milk chocolate. Compositions defined by area 2 are preferred because usually tempering conditions need not be altered. The compositions defined by areas 4, 5, 6, 7 and 8 have been found to be useful for the preparation of hardened milk chocolate.

Compositions defined by areas 6 and 7 are preferred because hardened milk chocolate can be obtained with surprisingly sharp-melting characteristics. Compositions defined by areas 4 and 6 are preferred because usually tempering conditions need not be altered.

Useful combinations of SOS/POS fat with palm mid-fraction, shea stearin, Illipe, or other cocoa-butter compatible hard fats (i.e. other mainly SOS/POS/POP fats), will be apparent from the figures, particularly FIGS. 18, 19 and 20, e.g. compositions that either lie within preferred areas or when combined with other fats, in particular with cocoa-butter, lie within such areas.

GENERAL NOTE ON STANDARDS

In this specification reference is constantly made to such terms as 'normal plain chocolate', 'normal milk chocolate', 'plain chocolate suitable for tropical use' and 'hardened milk chocolate'. Such terms are defined below. It must be noted that the percentage limits given in the specification are based on work which, somewhat arbitrarily, assumed that the given standards for such terms had to be met before the hard fat replacer could be stated to be satisfactory for the given purpose. These standards are high and it must be noted that adequuate products can, if lower standards were for some reason accepted, be obtained slightly outside the stated limits. It is reasonable to understand 'slightly outside' as covering an extra 5% each way, i.e. for a range given as 10% to 55%, an adequate product would be obtained in the range 5% to 60%.

The specification refers to such terms as 'cocoa-butter' and 'palm mid-fraction'. These terms too have to be defined, see below. The percentage limits given are based on use of, for example, cocoa-butter and palm mid-fraction of defined quality. Use of cocoa-butter or palm mid-fraction of lower or higher quality will affect slightly the relevance of the limits given in the specification: lowering the quality will require the incorporation of more SOS/POS fat, raising the quality will require the incorporation of less. For instance palm mid-fraction can usefully be combined with palm oil and SOS/POS fat; more SOS/POS fat will be used than when no palm oil is present.

The quality of the SOS/POS fat similarly plays a role. The percentage ranges given in the specification are based on results using material of defined quality, see the section below headed 'Material Used'. Use of SOS/POS fat of lower quality will favour the incorporation of more and the use of SOS/POS fat of higher quality will favour the incorporation of less.

To avoid overburdening the text with detail, the experimental data on which the limits and the figures are based are not given in full. Similarly figures are only given for SOS fat, for POS fat and for particular SOS/POS fats, see FIGS. 10 to 13. It will be appreciated that because the SOS and the POS do not disadvantageously influence each other either alone or in the presence of palm mid-fraction or cocoa-butter, similar figures demonstrating the advantage could be presented for other SOS/POS fats.

All the percentages in the specification are by weight.

DEFINITIONS

Palm Mid-Fraction

The palm mid-fractions, and the preferred palm mid-fractions, that can be used in the present invention are those that can be used in the invention described in GB patent specification No. 827,172.

Chocolate

In some countries the term 'chocolate' can only be used for products fulfilling certain requirements. In this specification for simplicity the term 'chocolate' is intended to cover all solid, edible fatty products based on cocoa, i.e. cocoa-powder or cocoa-liquor, whether or not the fat is partly cocoa-butter.

Normal Plain Chocolate

In the work on which the preferred limits for the use of SOS/POS fats is based it was taken that the fat had to fulfil the following dilatation limits in a normal plain chocolate:

$D_{20} > 1800$, $D_{25} > 1700$, $D_{30}$ 1100–1400 and $D_{35} < 100$.

Adequate Plain Chocolate

Similarly the dilatation limits for the fat in an adequate plain chocolate were taken to be $D_{20} > 1800$, $D_{30}$ 1100–1400 and $D_{35}$ 100–200.

Plain Chocolate suitable for Tropical Use

Similarly the limits were taken to be $D_{20} > 1800$, $D_{30} > 1400$ and $D_{35} < 200$ for the fat in a plain chocolate suitable for tropical use.

Normal Milk Chocolate

Similarly the dilatation limits for the fat in a normal milk chocolate (containing 15% milk-fat) were taken to be $D_{20} > 1300$, $D_{30}$ 600–900 and $D_{35} < 100$.

Adequate Milk Chocolate

Similarly the limits were taken to $D_{20} > 1300$, $D_{30}$ 600–900 and $D_{35}$ 100–200 for the fat in an adequate milk chocolate.

Hardened Milk Chocolate

Similarly the limits were taken to be $D_{20} > 1300$, $D_{30} > 900$ and $D_{35} < 200$ for the fat in a hardened milk chocolate.

It will be noted that all the work on milk chocolate used 15% milk fat, based on total fat. 15% was used to given an adequate standard but other levels can be used without losing the advantages of the invention. In general the more milk-fat is used the more SOS/POS fat, particularly SOS fat or SOS/POS fat consisting substantially of SOS, should be used. SOS/POS fat, particularly the SOS component, can be of special importance since it will enable, for instance, milk-chocolate to be made with a more than usual content of milk-fat.

As described, for instance in Minifie, Chocolate, Cocoa and Confectionery: Science and Technology, J. and A. Churchill, London, 1970, chocolate is normally prepared using either cocoa-powder or cocoa-liquor, which contains more hard butter. In either case cocoa-butter must be added. In this specification the term 'full replacer' is used for a hard fat that can be used successfully with cocoa-powder, which normally contains about 10% of the total fat requirements, in the preparation of chocolate. 'Partial Replacer' means that the hard fat replaces only part of the cocoa-butter required if cocoa-powder is used and 'replacer' means that at least part of the cocoa-butter required can be replaced.

Materials Used

Cocoa-Butter

In all the experiments on which the limits are based good quality, pure, pressed cocoa-butter was used. The characteristics are given in the following table.

Cocoa-Liquor

The cocoa-liquor used was normal and contained 54% cocoa-butter substantially the same as the cocoa-butter characterized in the following table.

Palm Mid-Fraction

The product used in the experiments was prepared by acetone fractionation as described in GB patent specification No. 827,172. Its characteristics are given in the following table.

Shea Stearin and Illipe

Neutralized and dried products were used. Their characteristics are given in the following table.

| Component | Palm Mid-Fraction | Illipe | Shea Stearin | Cocoa-Butter |
|---|---|---|---|---|
| Iodine value | 34.4 | 32.8 | 38.7 | 37.6 |
| Melting point (°C.) | 34.4 | | | 33.5 |
| Refractive index $N^{65}D$ 1.4 | 468 | | | 478 |
| f.f.a. (%) | 0.1 | 0.1 | 0.1 | 0.57 |
| Monoglycerides (%) | traces | | | 0.7 |
| Diglycerides (%) | 1.5 | | | 2.1 |
| Triglycerides* (%) | 98.5 | | | 96.7 |
| G 3 (% of Triglycerides) | 3.1 | 6.4 | 2.0 | 0.9 |
| G 2 U (% of Triglycerides) | 83.6 | 80.0 | 95.3 | 80.0 |
| G U 2 (% of Triglycerides) | 9.8 | 13.5 | 2.8 | 17.6 |
| U 3 (% of Triglycerides) | 3.5 | 0.5 | 1.7 | 1.5 |
| Asymmetric Triglycerides | | | | |
| in G 2 U fraction | 7.1 | 1.1 | 4.0 | |
| in G U 2 fraction | 8.3 | 0 | 0.6 | |
| Fatty acid composition** | | | | |
| C 14:0 | 0.4 | 0.3 | 0 | traces |
| C 16:0 | 57.1 | 16.5 | 4.0 | 26.4 |
| C 16:1 | | | | 0.6 |
| C 17:0 | | | | traces |
| C 18:0 | 7.5 | 43.6 | 57.5 | 34.4 |
| C 18:1 | 32.0 | 37.2 | 33.1 | 35.8 |
| C 18:2 | 3.0 | 1.4 | 3.4 | 2.5 |
| C 20:0 | traces | 0.8 | 2.0 | 0.3 |
| C 20:1 | — | — | — | traces |
| Unsaponifiable | 0.5 | 0.7 | 1.0 | 0.9 |

*G = saturated; U = unsaturated
**e.g. C 18:1 = mono unsaturated $C_{18}$ fatty acid

SOS/POS Fat

The analyses of the products used in the experiments on which the limits given in the specification (including the figures) for the use of SOS/POS fat are based are given in the following Tables.

TABLE

| | SOS (1) | | (4) | | (5) | |
|---|---|---|---|---|---|---|
| Acid value | 0.6 | | 0.2 | | 0.1 | |
| Saponification value | 190.0 | | 190.0 | | 191.0 | |
| Iodine values | — | | — | | 28.2 | |
| Triglyceride (%) | 99 | | >99 | | | |
| Lipase Analysis | Total | 2-position | Total | 2-position | Total | 2-position |
| C 16:0 | 1.4 | 0.3 | 1.9 | 0.5 | 2.5 | 0.05 |
| C 18:0 | 63.3 | 3.2 | 61.0 | 3.1 | 64.1 | 2.2 |
| C 18:1 | 32.1 | 94.0 | 34.4 | 94.2 | 32.6 | 96.0 |

TABLE-continued

|  | SOS (1) |  | (4) |  | (5) |  |
|---|---|---|---|---|---|---|
| C 18:2 | 0.9 | 1.7 | 0.5 | 1.8 | 0.3 | 0.7 |
| Other acids | 2.1 | 0.5 | 2.0 | 0.4 | 0.5 | 0.6 |
| Unsaturated | 33.3 | 96.1 | 36.4 | 96.0 | 32.9 | 96.7 |

TABLE

|  | POS (1) |  | (4) |  | (3) |  |
|---|---|---|---|---|---|---|
| Acid value | 0.1 |  | 0.4 |  | 0.1 |  |
| Saponification value | 196.0 |  | 194.8 |  | 198.5 |  |
| Iodine value | — |  | 13 |  | 28.8 |  |
| Triglyceride (%) | 99 |  | >99 |  |  |  |
| Lipase Analysis | Total | 2-position | Total | 2-position | Total | 2-position |
| C 16:0 | 31.2 | 1.0 | 30.0 | 1.3 | 30.4 | 0.9 |
| C 18:0 | 33.4 | 1.0 | 33.4 | 1.1 | 36.0 | 1.7 |
| C 18:1 | 33.1 | 96.1 | 35.0 | 95.1 | 32.2 | 96.1 |
| C 18:2 | 0.7 | 1.3 | 0.6 | 2.0 | 0.3 | 0.4 |
| Other acids | 1.4 | 0.1 | 1.0 | 0.5 | 1.0 | 0.5 |
| Unsaturated | 34.2 | 97.8 | 35.5 | 97.1 | 32.5 | 96.8 |

Availability of SOS/POS fat

In principle the SOS/POS fat can be a natural fat, or a fraction of a natural fat, but in practice SOS/POS fats of the required purity are most readily prepared by synthesis. Preferably the synthesis is based, for acceptability reasons, on natural fats as starting materials. Suitable preparative methods are indicated, for instance, by Malkin and Brown in Prog.Chem. Fats and Lipids, 4, 64 to 67 and Hartman in Chem.Rev., 58, 845 to 867. Particular synthetic routes starting from natural fats are indicated in U.S. Pat. No. 3,012,890 and 3,410,881 and in Canadian Pat. No. 920,139 and Belgian Pat. No. 775,303. Although in principle such methods can lead to 100% pure SOS/POS, in practice impurities are formed incidentally. It is a feature of the present invention that such impurities should conform to certain defined rules. Once these rules are appreciated, it will be comparatively easy to ensure that the amounts of the impurities are below the stated levels and that other impurities are absent or present in minimal amounts. Thus for instance the amounts of 2-erucoyldistearin and mono-aceto-triglycerides that can be formed during synthesis should form less than 1.5% of the SOS/POS fat.

TESTS AND PROCEDURES

Cooling curves (Pichard and Jensen), dilatations, tempering, demoulding, snap/hardness, finger-marking and bloom-resistance were measured and chocolate was prepared, for the experiments on which the figures are based, as our copending application Ser. No. 751,309; Ser. No. 751,309 is a continuation of Ser. No. 417,865 itself a continuation of Ser. No. 240,265, both now abandoned.

FIGURES

The figures are based on many hundreds of investigations and make apparent many advantageous aspects of the invention. Explanations for the codes used have been given in the text.

Figure 10:
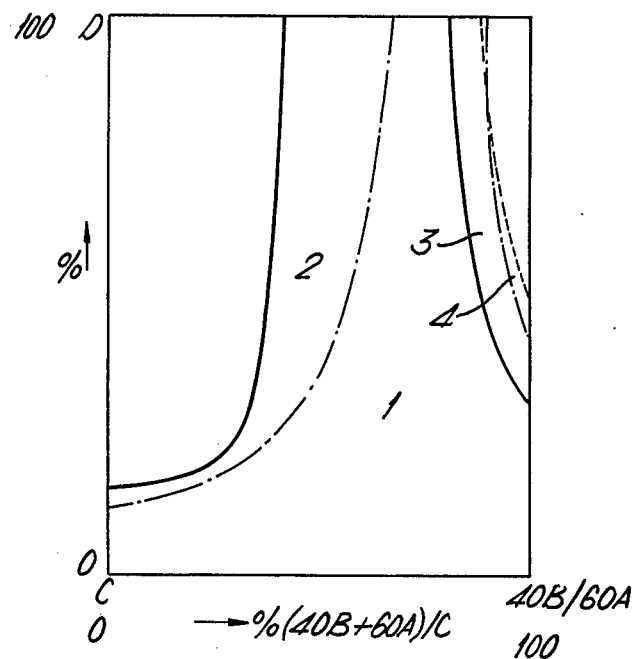
FIGS. 10 and 11 show mixtures (the numbered areas) of palm mid-fraction and a 40:60 mixture of SOS fat, and POS fat which mixtures can be used advantageously in chocolate.
Figure 12:
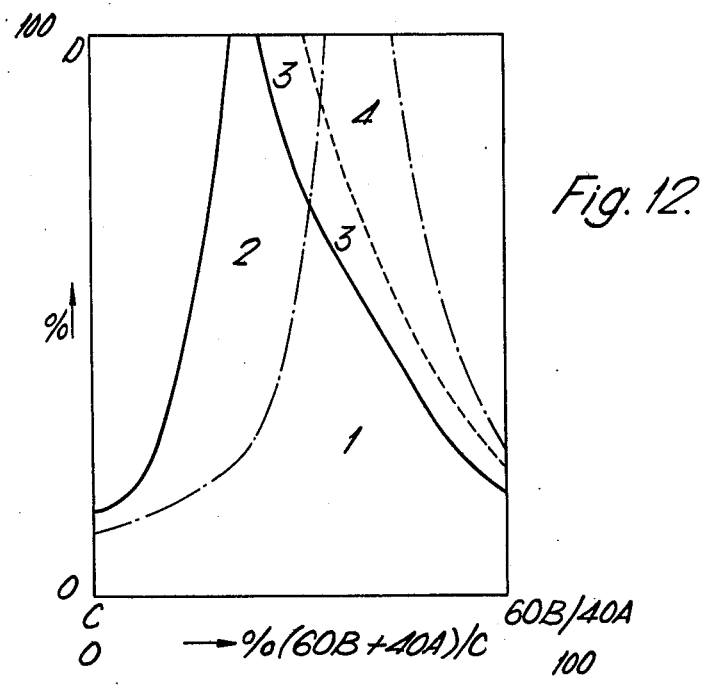
FIGS. 12 and 13 show mixtures (the numbered areas) of palm mid-fraction and a 60:40 mixture of SOS fat and POS fat which mixtures can be used advantageously in chocolate.

In FIGS. 10 and 12 areas 1 represent compositions that can give normal plain chocolate, areas 2 represent compositions that can give normal plain chocolate if possible change in tempering conditions is accepted, areas 3 represent compositions that can give plain chocolate suitable for tropical use and areas 4 represent compositions that can give plain chocolate suitable for tropical use if possible change in tempering conditions is accepted.

Figure 11:
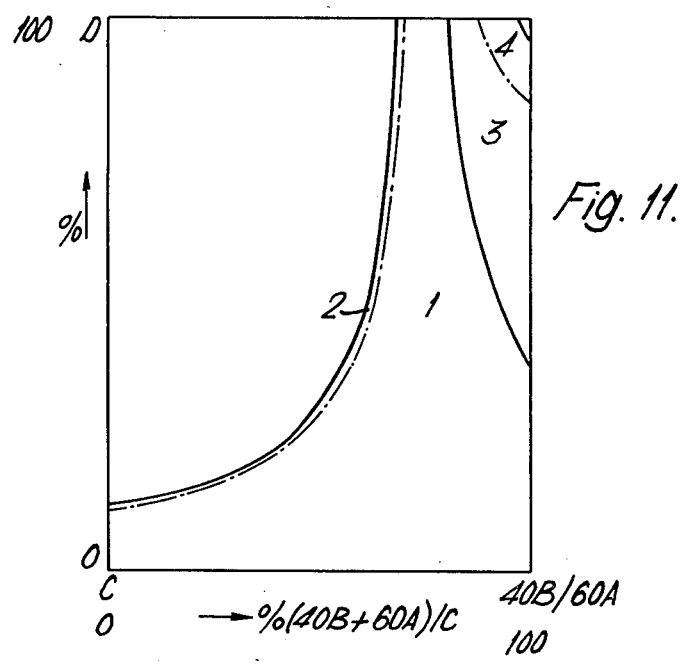
Figure 13:
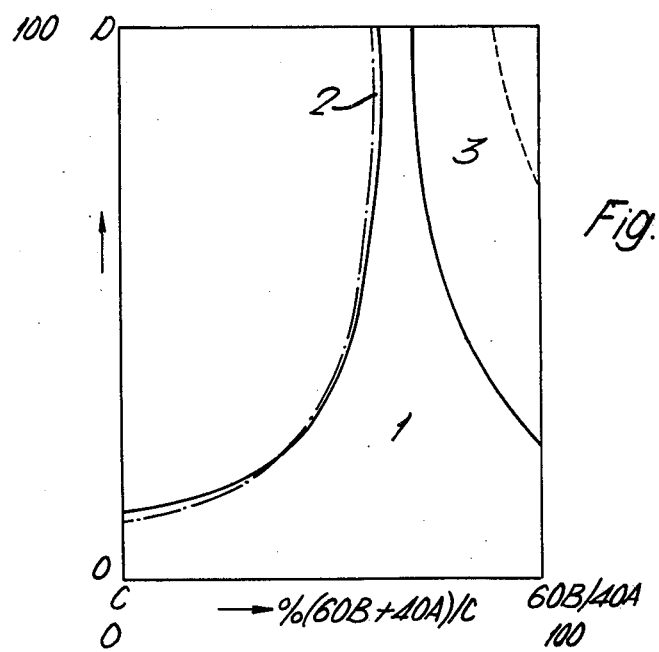

In FIGS. 11 and 13 areas 1 represent compositions that can give normal milk chocolate, areas 2 represent compositions that can give normal milk chocolate if possible change in tempering conditions is accepted, areas 3 represent compositions that can give hardened milk chocolate and areas 4 represent compositions that can give hardened milk chocolate if possible change in tempering conditions is accepted.

What is claimed is:

1. Chocolate in which the hard fat present has a 1,3-dipalmitoyl-2-oleoyl glycerol/1-palmitoyl-2-oleoyl-3-stearoyl glycerol/1,3-distearoyl-2-oleoyl glycerol (POP/POS/SOS)-composition within an area defined in FIG. 18, 19 or 20 and consists of a hard fat or blend of hard fats consisting of at least 60% 1,3-dipalmitoyl-2-oleoyl-3-stearoyl glycerol (POP), 1-palmitoyl-2-oleoyl-3-stearoyl glyceride (POS) and 1,3-distearoyl-2-oleoyl glycerol (SOS) but with a 1,3-dipalmitoyl-2-oleoyl glycerol/1-palmitoyl-2-oleoyl-3-stearoyl glycerol/1,3-distearoyl-2-oleoyl glycerol (POP/POS/SOS)-composition outside the area and a 1,3-distearoyl-2-oleoyl glycerol/1-palmitoyl-2-oleoyl-3-stearoyl glycerol (SOS/POS)-fat consisting essentially of (A) from 80% to 98% of 1,3-distearoyl-2-oleoyl glycerol (SOS) and 1-palmitoyl-2-oleoyl-3-stearoyl glycerol (POS), (B) other oleoyl, palmitoyl and stearoyl (O,P and S) triglycerides consisting, by weight of the 1,3-distearoyl-2-oleoyl glycerol/1-palmitoyl-2-oleoyl-3-stearoyl glycerol (SOS/POS)-fat, of
  (a) less than 5% of trisaturated glycerides (GGG),
  (b) less than 5% of tripalmitoyl glycerol (PPP),
  (c) less than 3% of eachh trisaturated glyceride (GGG) other than tripalmitoyl glycerol (PPP),
  (d) less than 10% 1,2-disaturated-3-oleoyl glycerol (GGO) consisting, by weight of the 1,3-distearoyl-glycerol (SOS/POS)-fat, of
    (1) less than 5% of each of 1-palmitoyl-2-stearoyl-3-oleoyl glycerol (PSO) and 1-stearoyl-2-palmitoyl-3-oleoyl glycerol (SPO),
    (2) less than 3% 1,2-dipalmitoyl-3-oleoyl glycerol (PPO), and
    (3) less than 8% 1,2-distearoyl-3-oleoyl glycerol (SSO),
  (e) less than 10% 1,2-dioleoyl-3-saturated glycerol (OOG),
  (f) 1,3-dipalmitoyl-3-oleoyl glycerol (POP), and (C)
  (a) less than 10% of each of 1,3-distearoyl-2-elaidoyl (and double bond isomers of elaidoyl) glycercol (SES) and 1,3-distearoyl-2-linoleoyl glycerol (SLnS),
  (b) less than 5% of each of 1-palmitoyl-3-stearoyl-2-elaidoyl (and double bond isomers of elaidoyl) glycerol (PES), 1-palmitoyl-2-linoleoyl-3-stearoyl glycerol (PLnS), 1,3-dipalmitoyl-2-elaidoyl (and double bond isomers of elaidoyl) glycerol (PEP) and 1,3-dipalmitoyl-2-linoleoyl glycerol (PLnP), and (D) partial oleoyl, palmitoyl and stearoyl (O, P and S), glycerides consisting, by weight of the 1,3-distearoyl- 2-oleoyl glycerol/1-palmitoyl-2-oleoyl-3-stearoyl glycerol (SOS/POS)-fat, of (a) less than 10% of each of total mono-glycerides, of total diglycerides, of glycerides containing at least one oleoyl group (O), and of unsaturated mono-glycerides, and (b) less than 6% of each of saturated mono-glycerides and of disaturated diglycerides, in (B), (C) and (D) at most 15%, based on the total fatty acids residues in the 1,3-distearoyl-2-oleoyl glycerol/1-palmitoyl-2-oleoyl-3-stearoyl glycerol (SOS/POS)-fat, of palmitoyl and stearoyl (P and S) being randomly replaced by myristoyl and arachidonoyl (M and A).

* * * * *

UNITED STATES PATENT AND TRADEMARK OFFICE
CERTIFICATE OF CORRECTION

PATENT NO. : 4,276,322

DATED : June 30, 1981

INVENTOR(S) : Frederick Bolton Padley et al.

It is certified that error appears in the above—identified patent and that said Letters Patent is hereby corrected as shown below:

On the cover sheet, Assignee should read

-- Lever Brothers Company, New York, N. Y. --.

Signed and Sealed this

Fifth Day of January 1982

[SEAL]

Attest:

GERALD J. MOSSINGHOFF

Attesting Officer

Commissioner of Patents and Trademarks